Figure 1:
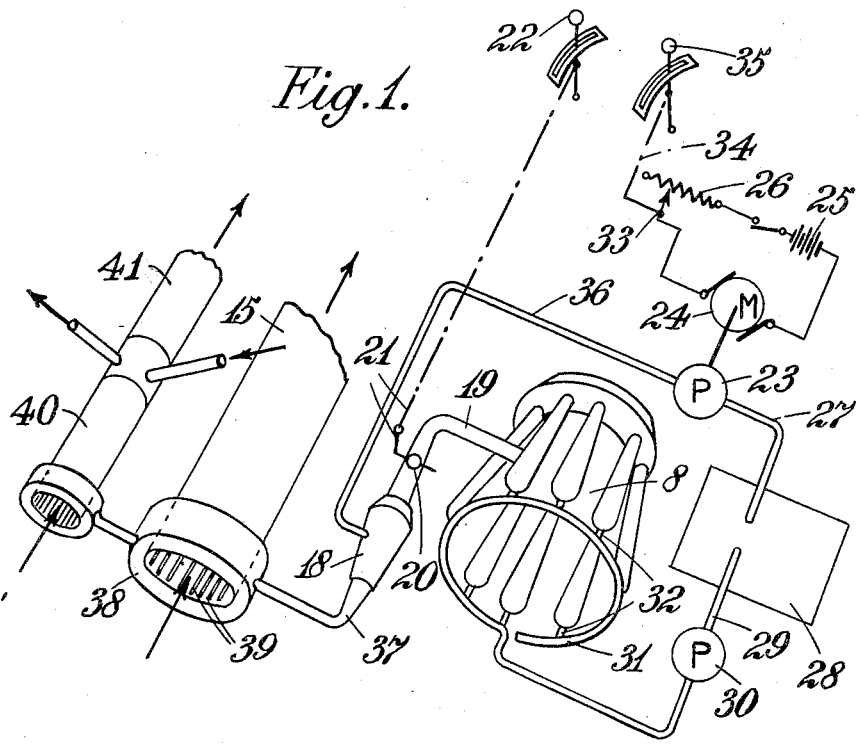

Oct. 13, 1953  F. C. I. MARCHANT ET AL  2,654,992
APPARATUS FOR PREVENTING OR REDUCING THE FORMATION
OF ICE ON THE AIR DUCTS OF GAS TURBINE ENGINES
Filed March 1, 1948

INVENTORS
FRANCIS C.I. MARCHANT
& JOHN E. BELL
BY Wilkinson & Mawhinney
ATTORNEYS Patented Oct. 13, 1953

2,654,992

UNITED STATES PATENT OFFICE 2,654,992

APPARATUS FOR PREVENTING OR REDUCING THE FORMATION OF ICE ON THE AIR DUCTS OF GAS TURBINE ENGINES

Francis Charles Ivor Marchant and John Ernest Bell, Bristol, England, assignors to The Bristol Aeroplane Company Limited, Bristol, England, a British company Application March 1, 1948, Serial No. 12,416
In Great Britain March 18, 1947

6 Claims. (Cl. 60—39.09)

This invention concerns apparatus for preventing or reducing the formation of ice on the air ducts of gas turbine engines and on the rotating members of the compressor which forms a part of such engines.

The invention has for its object to provide an apparatus which is applicable to gas turbines of different constructions, the apparatus being readily adapted to suit any particular installation.

Another object is to provide an apparatus which will economically deal with a wide range of icing conditions and which is regulated in a simple manner for this purpose.

Accordingly, the present invention is characterised in that hot gases are generated in a combustion chamber separate from the gas turbine engine by burning fuel in a stream of air delivered to the chamber from the compressor of the engine, said gases being discharged into the air entering the intake.

According to one feature of this invention apparatus for preventing or reducing the formation of ice on the air ducts of gas turbine engines comprises a heater, separate from the engine, which receives air for combustion from the compressor of the turbine engine, and in which fuel is burnt, and means for conveying hot gases from the heater and discharging them into the air going through the air intake.

According to another feature of this invention the apparatus comprises a heater, separate from the engine, means for conveying air from the compressor of the turbine engine to the heater, means for supplying fuel to the heater, means for conveying hot gases from the heater, a manifold surrounding the air intake of the turbine engine and to which the hot gases are conveyed and means for discharging said hot gases from the manifold to within the air intake.

The fuel for the heater is preferably drawn from the supply provided for operation of the turbine engine by a pump, the delivery of which is under the control of the operator so that the anti-icing effect may be adjusted by varying the quantity of fuel passing to the heater. Alternatively or additionally, the anti-icing effect may be varied by manually adjusting the quantity of air passing to the heater. Thus, the air may be controlled by a valve between the compressor and the heater. In the case of an axial-flow compressor the control may comprise one or more valves (for example poppet valves) located at various stages of the compresssor and regulating the passage of air therefrom to the heater. If desired the fuel and/or air supply may be automatically controlled e. g. depending upon ambient temperature.

Figure 2:
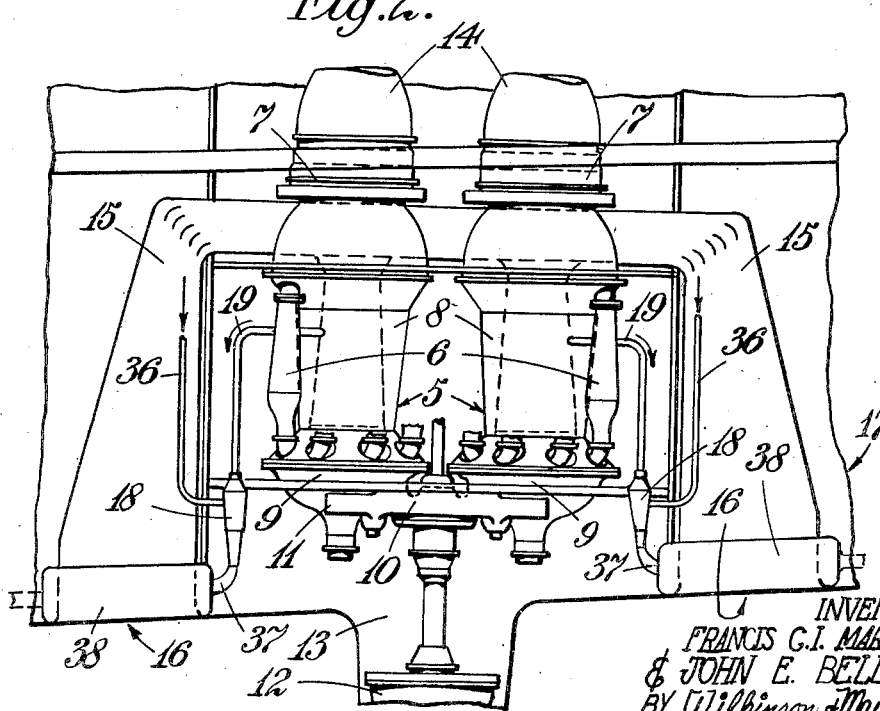

In order that the nature of the invention may be better understood a practical application thereof will now be described, merely by way of example, with reference to the accompanying drawing whereof:

Figure 1 is a purely schematic layout of apparatus in accordance with the present invention, and Figure 2 is a plan view showing a part of the wing of an aeroplane which is driven by a gas turbine engine incorporating apparatus in accordance with the present invention.

Referring first of all to Figure 2, the aeroplane (not shown) has in each wing a power plant which comprises a pair of gas turbine engines lying side by side and coupled together to drive a counter-rotating propeller assembly. Each turbine engine of the power plant comprises a compressor assembly 5, a plurality of combustion chambers 6 which receives air delivered by the compressor assembly and in which fuel is burnt and a turbine 7 through which the products of combustion pass.

The compressor assembly 5 comprises a low-pressure axial compressor 8 which delivers to a high-pressure centrifugal compressor 9: the latter in turn delivers to the combustion chamber 6.

Each turbine 7 drives a compressor assembly by a shaft which extends from the turbine forwardly towards the compressors. Each turbine 7 also drives a gear box 10 through a transmission carried within the housing 11. The turbines are coupled together through the gear box 10 and the latter transmits drive to reduction gearing contained within the housing 12.

The power plant is buried in the wing and the housing 12 is supported within a monocoque structure 13. The counter-rotating propeller is mounted at the forward end of the structure 13.

The exhaust gases from the turbines 7 pass by a tailpipe 14 to the trailing edge of the wing and are discharged therefrom to assist in the propulsion of the aeroplane.

The compressor assembly of each engine is supplied with air through a duct 15 which extends from the compressor to an opening 16 in the leading edge of the wing. The opening 16 is located behind the propeller so as to take advantage of the ram effect thereof.

Although the exhaust gases from the turbine 7 could be used as a source of heat to prevent the formation of ice on its associated intake 15 the pressure of the gases relatively to the air pressure in duct 15 normally precludes this.

The present invention provides an apparatus to reduce or prevent the formation of ice, the apparatus being capable of use with gas turbine engines of different constructions and being readily adapted to suit any particular installation of power plant. Figure 2 shows the adaptation of the apparatus to the power plant described above.

Referring to this figure and to Figure 1 of the drawings: the apparatus comprises a heater or combustion chamber 18 which is connected by a pipe 19 with the axial compressor 8. Air under pressure may flow from the compressor 8 by pipe 19 to the heater 18. To regulate the quantity of air passing from the compressor to the heater there is provided a butterfly valve 20. The valve 20 is connected by a lever mechanism diagrammatically indicated at 21 with a control lever 22 mounted in the pilot's cockpit. The pilot may therefore adjust the quantity of air passing to the heater 18.

Fuel is supplied to the heater 18 by a pump 23 which is driven by an electric motor 24 connected in series with a battery 25 (for instance, the aircraft battery) and with a variable resistance 26. The pump draws fuel by a pipe 27 from the tank 28. The pump 23 delivers to heater 18 by a pipe 36. This tank contains the fuel for the operation of the gas turbine engines. The fuel is withdrawn from the tank 28 through a pipe 29 by a pump 30 and delivered to a ring 31 which is connected by branches 32 with each of the combustion chambers 6.

The adjustable arm 33 of the resistance 26 is connected as at 34 with a control lever 35 which is mounted within the cockpit of the aeroplane. By adjusting the lever 35 the resistance in the circuit of the motor 24 is varied and as a consequence the delivery of the pump 23 is adjusted.

With the foregoing arrangement it will be clear that the quantity of fuel and of air entering the heater 18 may be adjusted to suit any flight conditions.

The hot gases generated in the heater 18 are conveyed along a pipe 37 to an elliptical manifold 38. The elliptical manifold 38 is hollow and defines the mouth of the air intake 15 so that the air passing into the intake must first of all flow through the manifold 38. The inner surface of the manifold 38 is provided with a plurality of jets 39 which face inwardly of the intake 15. The jets in the preferred arrangement take the form of long narrow slits so designed and disposed on manifold 38 as to direct "ribbons" of hot gas into the intake in such a way that the ribbons intermingle with the air with the minimum possible turbulence. The slits should also result in the least possible aerodynamic interference with the air flow through duct 15 when heating is not required. Moreover, the slits do not tend to soot up so readily as small circular jets.

With the arrangement described hot gases from the heater 18 pass into the manifold 38 which therefore becomes heated. The gases are discharged from the manifold 38, after heating it, through the nozzles 39 at a high velocity and towards the centre of the intake 15. As a consequence the hot gases mingle with the air flowing along the intake 15 towards the compressor assembly 5. It will be appreciated, therefore, that with the arrangement described a two-fold heating effect is obtained, that is, firstly by heating the manifold 38 and, secondly, by ejecting the hot gases into the air stream.

As stated above the heating effect is varied by varying the fuel delivered by the pump and the quantity of air delivered to the heater by the compressor; with this arrangement the apparatus is under the direct control of the pilot. Since it makes use of the fuel supply for the power plant, duplication of storage tanks, pipe lines and so on is reduced to a minimum so that the apparatus is of small weight.

As is clear from Figure 2 the heater is disposed adjacent the air intake so that the apparatus operates at a high efficiency. Furthermore, with the apparatus described the temperature of the gases delivered by the heater may be in excess of the temperature of the working medium in the gas turbine engine 7. The latter commonly operates at about 350° C. so that if the exhaust gases from the turbine are used for anti-icing the effect is limited by this temperature.

In the installation described with reference to Figure 2 in which a pair of gas turbine engines are coupled together, there is preferably provided a separate air intake 15 for each engine. There is also associated with each intake a heating apparatus as above described. In such an arrangement means is preferably provided to interconnect the heating apparatus so as to ensure that in the event of a breakdown of one such apparatus the other may be used to heat both air intakes. Furthermore, in the event that one turbine engine is put out of use—as may be done by the pilot during cruising of the aeroplane—the heating apparatus of the other power plant may be used to prevent or reduce the ice formation on the air intake of the inoperative engine.

It will be appreciated that the heater may be used, instead of, or additionally to heating the air duct 15, for heating other air ducts on the aeroplane or even for heating the wings themselves to prevent or reduce the formation of ice thereon. For instance, the air intake 40 to an oil cooler 41. In any such application of the invention the temperature of the gases will be suitably selected so that ice cannot form at any part along the length of the air passageway lying downstream from the manifold. It is to be understood that the manifold may be disposed so as to produce a heating effect at any part along the length of the air duct and that the invention is not limited to the production of this effect at the inlet throat alone.

An important advantage of the apparatus described lies in the ability to draw air from that stage of the compressor which will provide the minimum pressure necessary for the satisfactory operation of the apparatus. This means that the work expended in compressing air for the apparatus will be as low as is possible. The greater power expended in providing greater pressures than those indicated above will not necessarily be usefully recovered in the apparatus.

The expression anti-icing as used throughout the specification and claims includes the removal of ice already formed on a surface and the prevention of such ice formation at all.

We claim:

1. A gas turbine engine comprising a compressor, a duct conveying atmospheric air to the compressor, combustion equipment which receives air from the compressor and in which fuel is burnt, a turbine driven by the products of combustion and driving the compressor, a combustion chamber, separate of the engine combustion equipment, a pipe to carry air only from the engine compressor to said combustion chamber, means for supplying and burning fuel in said combustion chamber and a conduit to convey the combustion gases from said chamber to said duct and for discharging said gases into the stream of air passing through the duct.

2. A gas turbine engine comprising a compressor, a duct conveying atmospheric air to the compressor, combustion equipment which receives air from the compressor and in which fuel is burnt, a turbine driven by the products of combustion and driving the compressor, a combustion chamber, separate of the engine combustion equipment, a pipe to convey air only from the engine compressor to said combustion chamber, means for supplying and burning fuel in said combustion chamber, a manifold surrounding the duct and communicating therewith and a conduit to convey the combustion gases from said chamber to the manifold for discharge into the duct.

3. A gas turbine engine comprising a compressor, a duct conveying atmospheric air to the compressor, combustion equipment which receives air from the compressor, a fuel system to deliver fuel to the combustion equipment, a turbine driven by the products of combustion and driving the compressor, a combustion chamber, separate of the engine combustion equipment, a pipe to convey air from the engine compressor to said combustion chamber, a pump separate of the engine fuel system for delivering fuel therefrom to the combustion chamber, means for controlling the pump delivery, and a conduit to convey the combustion gases from said chamber to said duct and for discharging said gases into the stream of air passing through the duct.

4. A gas turbine engine according to claim 3 wherein an adjustable valve is provided to control the quantity of air passing from the compressor to the combustion chamber.

5. A gas turbine engine comprising a compressor, a duct conveying atmospheric air to the compressor, combustion equipment including a combustion chamber which receives air from the compressor and in which fuel is burnt, a turbine driven by the products of combustion from said combustion chamber and driving the compressor, a combustion chamber independent of and separate from the combustion chamber of the engine combustion equipment, a pipe to carry air from the engine compressor to said independent combustion chamber, means for supplying and burning fuel in said independent combustion chamber, and a conduit to convey the combustion gases from said independent chamber to said duct and for discharging said gases into the stream of air passing through the duct.

6. A gas turbine engine comprising interconnected low pressure and high pressure compressors, a duct conveying air to the low pressure compressor, combustion equipment comprising a combustion chamber which receives air from the high pressure compressor, a fuel system to deliver fuel to the combustion equipment, a turbine for receiving the products of combustion from said combustion equipment and driven thereby and driving the compressors, a combustion chamber independent of and separate from the combustion chamber of the engine combustion equipment, a pipe communicating with said low pressure compressor and said independent combustion chamber to convey air from the low pressure compressor to said independent combustion chamber, a pump separate of the engine fuel system for delivering fuel therefrom to said independent combustion chamber, means for controlling the pump delivery, a conduit to convey the combustion gases from said independent chamber to said duct and for discharging said gases into the stream of air passing through the duct, and valve means for controlling the supply of air from the low pressure compressor to said independent chamber.

FRANCIS CHARLES IVOR MARCHANT.
JOHN ERNEST BELL.

References Cited in the file of this patent
UNITED STATES PATENTS

| Number | Name | Date |
|---|---|---|
| 1,924,122 | Jones | Aug. 29, 1933 |
| 2,327,202 | McCollum | Aug. 17, 1943 |
| 2,357,112 | Heymann | Aug. 29, 1944 |
| 2,393,792 | McCollum | Jan. 26, 1946 |
| 2,399,046 | Larrecq | Apr. 23, 1946 |
| 2,404,275 | Clark | July 16, 1946 |
| 2,409,177 | Allen | Oct. 15, 1946 |
| 2,411,227 | Planiol | Nov. 19, 1946 |
| 2,425,630 | McCollum | Aug. 12, 1947 |
| 2,435,990 | Weiler | Feb. 17, 1948 |
| 2,469,375 | Flagle | May 10, 1949 |